Figure 1:
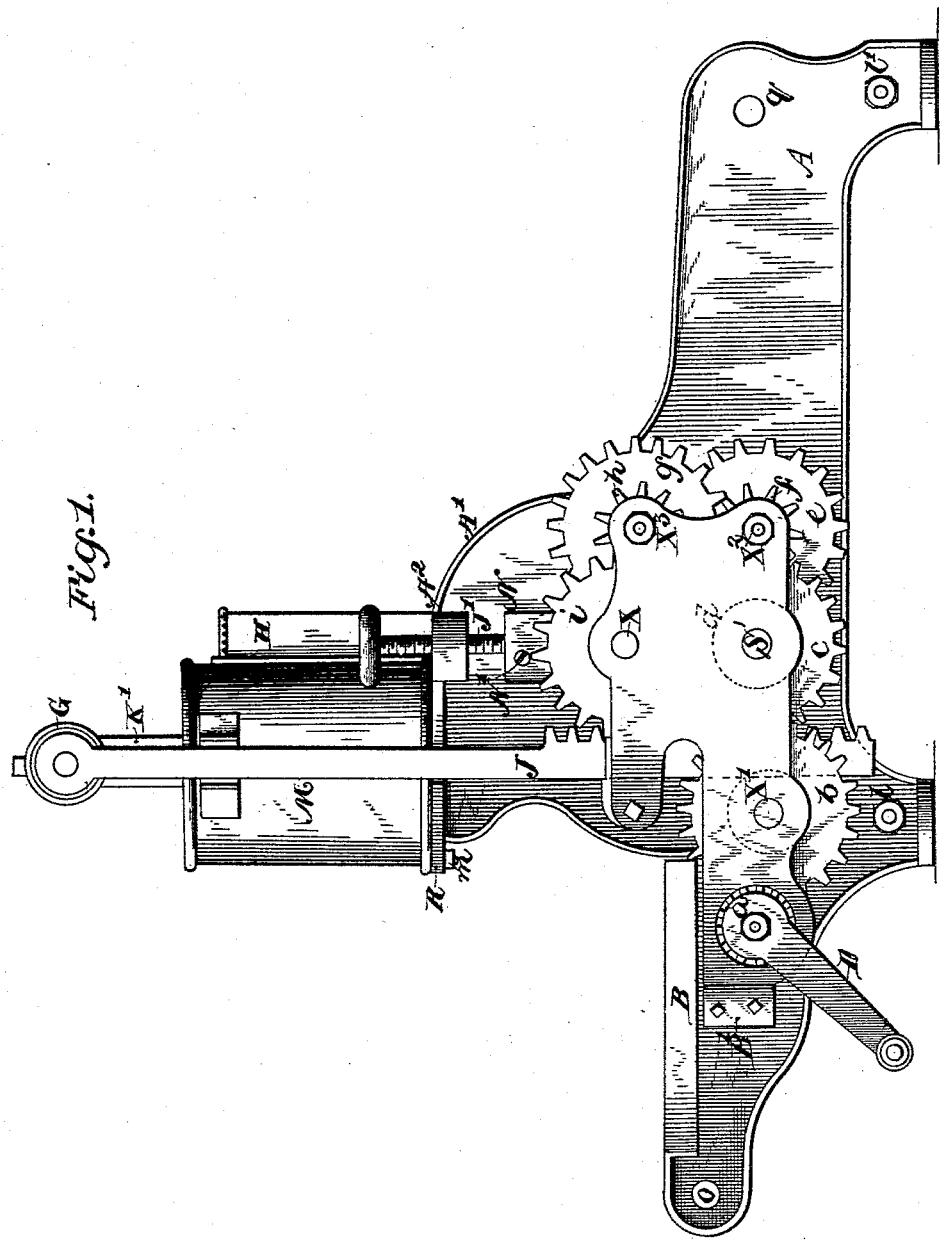

(No Model.) 2 Sheets—Sheet 1.

B. I. LINGLE & L. CRULL.

MACHINE FOR BACKING FACING PLATES FOR WALL SURFACES.

No. 373,670. Patented Nov. 22, 1887.

Witnesses
C. Fred. Hallot.
J. M. Weaver.

Inventors,
Benjamin I. Lingle
Lafayette Crull.
By Theophilus Weaver
Their Attorney

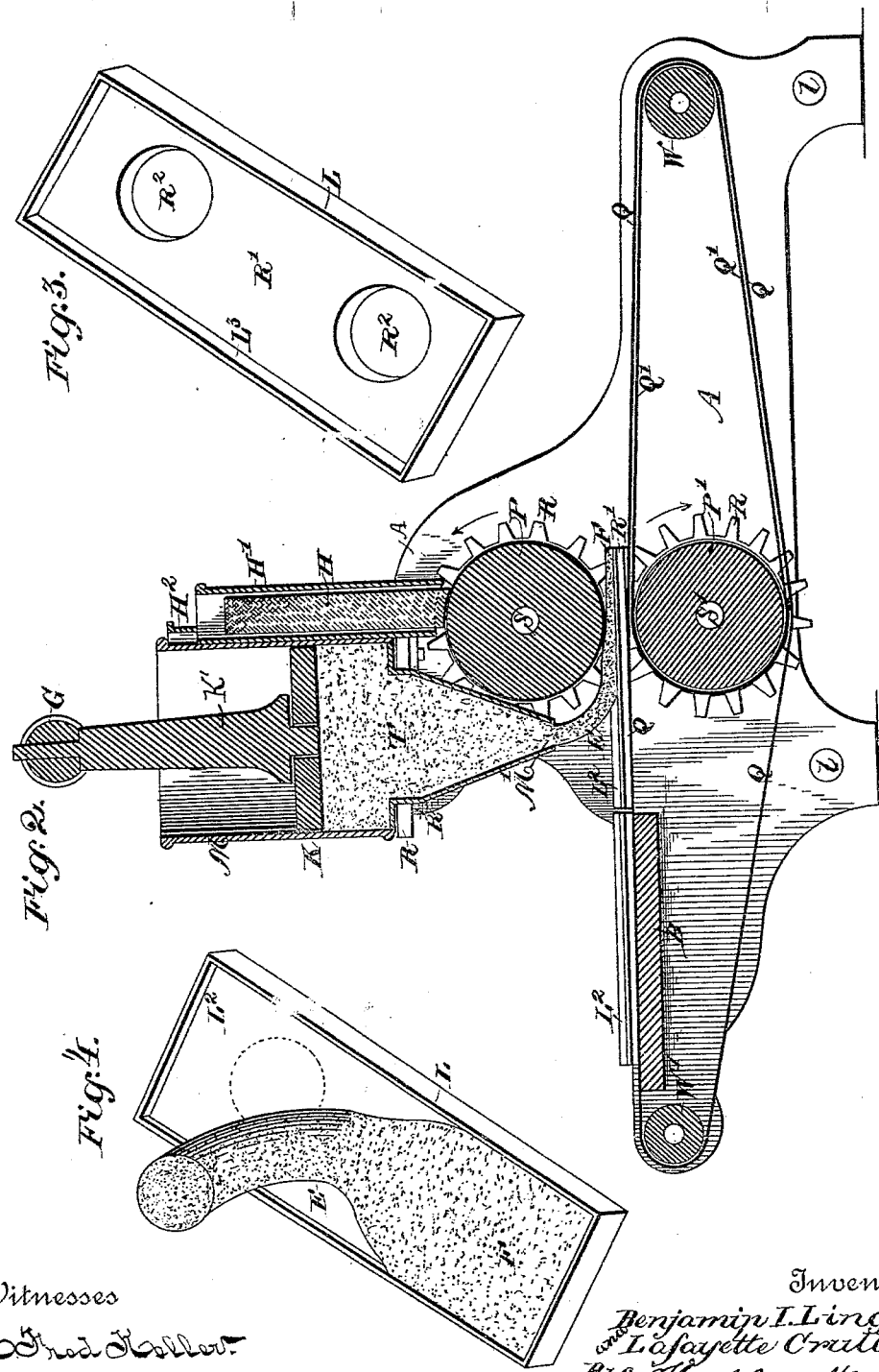

UNITED STATES PATENT OFFICE.

BENJAMIN I. LINGLE AND LAFAYETTE CRULL, OF HARRISBURG, PENNSYLVANIA; SAID LINGLE ASSIGNOR TO SAID CRULL.

MACHINE FOR BACKING FACING-PLATES FOR WALL-SURFACES.

SPECIFICATION forming part of Letters Patent No. 373,670, dated November 22, 1887.

Application filed February 11, 1887. Serial No. 227,281. (No model.)

*To all whom it may concern:*

Be it known that we, BENJAMIN I. LINGLE and LAFAYETTE CRULL, both citizens of the United States, residing at Harrisburg, in the county of Dauphin and State of Pennsylvania, have invented a new and useful Machine for Backing Facing - Plates for Wall and other Surfaces, of which the following is a specification.

The object of our said invention is to provide a machine adapted to apply expeditiously to the rear side of a plate of glass or other material for facing-surfaces a liner of putty or other adhesive therefor in such manner as to thoroughly exclude the air from between the plate and the liner, thus obtaining a liner of uniform thickness and a facing free of discoloring blister-marks or a showing through the transparent facing of blemishes in the coloring, as now occurs where the liner is not hermetically applied to such facing plates.

Our improvement therefore for said purpose embraces the following: First, means for moving the surfacing-plate longitudinally while it is being provided with the liner; second, means for feeding the adhesive in a continuous cylindrical body onto the plate in sufficient quantity to form the liner; third, a pair of drums, into the interstice between which an endless belt conveys the molds for having compressed upon the plates therein the liners air-tight; fourth, the molds adapted for use on said machine and for discharging the plate, and, fifth, means for dusting the pressing-drum to free it of the adhesive.

The particular features of said devices will be hereinafter more fully described, and pointed out in the claims, reference being had to the accompanying drawings, making a part of this specification, in which—

Figure 1 is a side elevation of our machine; Fig. 2, a longitudinal vertical section of the same; Fig. 3, a perspective view of one of the molds; Fig. 4, a similar view of the same with a plate therein and partly backed by a liner as in course of being pressed thereon.

Similar letters denote the same parts in all the views.

Letter A denotes one of the similar sides of the machine-frame, the same being braced together below by the bolts $l\ l'$ and by the bed-piece B above. In the ends of said frames, near the top thereof, are the bearings $q\ o$ of the rollers W W', respectively, and near the middle of the same are the bearings for the shaft S' of the lower driver-drum, P'. The upper parts, A', of said frames A are connected by the plate R, bolted on the flanged tops thereof. On said tops are also formed the abutments $A^2$, in which work the screws J', whose lower ends are swiveled in the sliding blocks N by the screws N'. Said blocks have in them the bearings for the drum P, and they traverse vertical ways in said frames, for adjusting said pressing-drum to increase or lessen the distance between it and the drum P', arranged parallel to the other. Said drums have at their ends the gears R, which communicate with each other. The drum P' and the roller W are embraced by the belt Q', tautly applied to them, and the rollers W and W' are embraced by the extensive outer belt, Q, also tautly applied to them and inclosing the belt Q', as shown in Fig. 2. The bed-piece B is either plowed out on top to form a way thereon, or has thereon lateral ledges as guides for keeping the molds L in a central line of travel over the drum P'. The object of duplicating said belts is that they shall have a constant movement, owing to the under belt, Q', being driven by the constantly-rotating drum P'. If, however, the outer belt, Q, is used alone, it will also have a constant movement while the molds L are being passed successively through the space between the drums, they gaging said space, and by pressing said belt on the drum P' it will be moved by it. The said belts are made of cloth of several thicknesses, thus forming an elastic conveyer as a means for both bringing the molds up to the drum P and for causing the same to receive the tread of said drum with continuous pressing impact, thus evenly distributing the liners air-tight upon the plates in the molds, the adhesive being fed thereon as will be explained.

The drum P' has on its shaft S' the gear-wheel $c$, with which the pivoted wheel $b$ meshes for reversing its direction, and which latter is driven by the pinion $a$ on the winch D, as shown. The drum P', being geared with the drum P, drives it constantly by said means.

Upon the plate R is secured by the bolts m the cylindrical vessel M, formed with the conical or converged bottom shown, whose lower end has in it the circular exit M', whereat the adhesive T is caused to come out in a continuous cylindrical body, E, as will be next explained. Into the body of said vessel is fitted the piston K, formed with the shaft K', having thereon the cross-head G, whose ends are trunnions or axes, on which are pivoted the vertically-guided rack-bars J, arranged oppositely, both provided at top with eyes, in which the said trunnions work. The piston when fully elevated may swing aside out of the way for charging said vessel, and said bars are provided below with teeth, which similar opposite wheels, $i$, engage for operating said piston for bearing on said adhesive to press it gradually out at said exit E and for raising the piston for charging said vessel. The said wheels $i$ on both sides of the machine-frame are coupled with opposite similar pinions, $d$, on the shaft S' by similar couples of wheels and pinions, $e f$ and $g h$, respectively, the same being arranged similarly on both sides of the machine-frame for operating said rack-bars J similarly and simultaneously. The order of meshing in said trains is as follows: The pinion $d$ drives the wheel $e$. The pinion $f$ thereon drives the wheel $g$. The pinion $h$ drives the wheel $i$, and the latter engages the rack-teeth. The rack-bars are moved quite slowly, that only a little more than enough adhesive shall be pressed out at the exit M' to make the liners continuously as the molds L are brought forward in a regular train by the belt Q. The drums P P' are run correspondingly slow, that the air shall be excluded from under the liners as they are being pressed by the drum P onto the plates L² contained in said molds. For the same purpose the adhesive matter, T, preferably of soft putty, with any coloring-matter desired added thereto, is fed out of the vessel M in a continuous cylindrical body, E, that as it is being flattened by the drum P onto the plate, as shown in Fig. 4, the air shall be certainly excluded.

The plate R is cut away centrally, that the bottom of the vessel M may be firmly supported thereon, as shown.

The molds L are formed with the bottom R', having therein one or more apertures or thumb-holes, R², and with the rim L³ raised above said bottom and forming a receptacle, in which the facing-plate L², of glass or other material, is laid for having impressed thereon the liner F. After the liner has been impressed on the plate, the two combined are readily lifted or pushed out of the mold by the thumbs, thrust from the under side through said holes R², while the fingers have holds at the ends of the mold for holding it in correct position for applying the lined plate directly on a surface. The edges of said molds L being narrow at top and the pressing-drum P being adjusted to walk forcibly on said edges, the adhesive over and above what is necessary to form the liner will be squeezed off at said edges and excluded.

Vertically above the pressing-drum P is arranged the bottomless receptacle H, extended transversely nearly the whole length of said drum. Into the receptacle is loosely inserted the friable or powdery cake H', which at its lower end constantly rides on said drum and by wearing dusts thereon whiting or matter of which the cake is formed, so that the adhesive shall not stick to the drum while pressing the liner.

We claim, in a machine for backing facing-plates for wall and other surfaces—

1. The parallel drums P P', geared together at their ends, and the pressing upper drum having its bearings in blocks that may be adjusted to vary the opening between the drums, in combination with the conveyer-belt Q, supported upon the rollers W W' and traveling over the driver-drum P', a series of molds, L, guided upon and moved forward by said belt, a vessel, M, having therein a piston, K, and adapted for depositing adhesive matter in a continuous discharge at an exit, M', onto said molds, and mechanism for moving said belt and piston, substantially as and for the purposes set forth.

2. The combination, with the intergeared drums P P' and the belt Q, stretched over the rollers W W' and traveling over the drum P' of the auxiliary under belt, Q', stretched over the roller W and said drum for constantly propelling said other belt, of the blocks N, having therein the bearings of the upper drum, P, and being adjusted by the screws J', and the bed B, adapted for guiding the molds L on the belt Q to come vertically under the exit M' for the adhesive, substantially as and for the purposes set forth.

3. The combination, with the parallel drums P P', geared together as a gaging-press, and with the endless belt Q, arranged as a conveyer of the molds L to and through the opening between the drums, of the vessel M, formed with conical bottom, having the circular exit M' arranged vertically over the mid-line of the path of said belt, the piston K, fitted into said vessel and adapted to bear on the mass of adhesive, T, and force thereof out at said exit the cylindrical body E, and mechanism communicating with the cross-head on said piston and with said drums to time their movements, that as molds containing the plates to be backed are advanced enough of the adhesive shall be deposited longitudinally thereon to make the liners when compressed by the drum P, said cylindrical body being in the latter operation adapted to exclude the air as the liners are formed thereby, substantially as shown and described.

4. The combination, with the drums G G', geared together adjustably, of the belt Q, passed around the rollers W W' and over the lower drum, P', a series of molds, L, placed upon said belt to succeed each other closely, the vessel M, containing the adhesive, T, and formed with the circular exit M', the piston K, fitted into said vessel and having its cross-head G coupled with the rack-bars J, and the train of gears $a\ b\ c\ d\ e\ f\ g\ h\ i$, communicating, as shown and described, and adapted to operate said piston and said drums uniformly, with relation to bring down the adhesive in a cylindrical body, E, onto the said molds containing the facing-plates, in adequate portion to form the liners under pressure consecutively as the molds pass said drums, substantially as set forth.

5. The combination, with the pressing-drum P, of the bottomless receptacle H, arranged above the drum, and a powdering-cake, H', in said receptacle freely riding on the drum, as and for the purpose set forth.

BENJAMIN I. LINGLE.
LAFAYETTE CRULL.

Witnesses:
THEOPHILUS WEAVER,
D. C. MAURER.